United States Patent
Wang et al.

(10) Patent No.: US 10,303,518 B2
(45) Date of Patent: May 28, 2019

(54) CONGESTION NOTIFICATION METHOD, RELATED DEVICE, AND SYSTEM

(71) Applicant: Huawei Technologies Co., Ltd., Shenzhen (CN)

(72) Inventors: Shuo Wang, Shanghai (CN); Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 15/590,728

(22) Filed: May 9, 2017

(65) Prior Publication Data

US 2017/0242730 A1    Aug. 24, 2017

Related U.S. Application Data

(63) Continuation of application No. PCT/CN2014/090750, filed on Nov. 10, 2014.

(51) Int. Cl.
*G06F 9/50* (2006.01)
*H04W 28/02* (2009.01)
(Continued)

(52) U.S. Cl.
CPC ............ *G06F 9/505* (2013.01); *G06F 15/18* (2013.01); *H04L 29/08099* (2013.01);
(Continued)

(58) Field of Classification Search
CPC ............ H04W 28/02; H04W 28/0247; H04W 36/0022; H04L 45/028; H04L 29/08099; H04L 47/12
See application file for complete search history.

(56) References Cited

U.S. PATENT DOCUMENTS

2014/0369206 A1* 12/2014 Karlsson ............... H04W 60/00
370/236.1
2015/0365843 A1* 12/2015 Miklos et al. .... H04W 28/0289
370/235
(Continued)

FOREIGN PATENT DOCUMENTS

| CN | 102197664 A | 9/2011 |
| CN | 103391529 A | 11/2013 |
| CN | 104053182 A | 9/2014 |

OTHER PUBLICATIONS

3GPP TR 23.705 V1.1.0 (Oct. 2004) 3rd Generation Partnership Project; Technical Specification Group Services and System Aspects; Study on system enhancements for user plane congestion management (Year: 2014).*

(Continued)

*Primary Examiner* — Gary Mui
(74) *Attorney, Agent, or Firm* — Conley Rose, P.C.

(57) ABSTRACT

A congestion notification method, a related device, and a system, where the method includes receiving, by a network side device, a congestion status of a target network area sent by a radio access network (RAN) congestion awareness function (RCAF) entity, where the target network area is a network area involved in an application service provided by a target application server; and sending, by the network side device, the congestion status of the target network area to the target application server. Hence, an application server may able to learn in time when congestion occurs, and adjust, according to the congestion situation, a related service in an area corresponding to the congestion situation.

7 Claims, 9 Drawing Sheets

(51) Int. Cl.
  G06F 15/18    (2006.01)
  H04L 29/08    (2006.01)
  H04L 12/759   (2013.01)
  H04W 36/00    (2009.01)
  H04L 12/801   (2013.01)
  G06F 17/10    (2006.01)
  H04L 29/06    (2006.01)
  H04L 12/751   (2013.01)
  H04W 36/08    (2009.01)

(52) U.S. Cl.
  CPC ........... *H04L 45/028* (2013.01); *H04L 47/12* (2013.01); *H04W 28/02* (2013.01); *H04W 28/0247* (2013.01); *H04W 36/0022* (2013.01); *G06F 17/10* (2013.01); *H04L 29/06* (2013.01); *H04L 45/02* (2013.01); *H04W 36/08* (2013.01)

(56) References Cited

U.S. PATENT DOCUMENTS

| | | | | |
|---|---|---|---|---|
| 2016/0255522 | A1* | 9/2016 | Emanuelsson | H04W 4/70 370/252 |
| 2016/0337239 | A1* | 11/2016 | Nasielski | H04L 47/11 |
| 2017/0019750 | A1* | 1/2017 | Palanisamy | H04W 28/0289 |

OTHER PUBLICATIONS

3GPP TR 23.789 V0.3.0 (Oct. 2014) 3rd Generation Partnership Project; Technical Specification Group Services and System Aspects; Monitoring Enhancements; (Release 13) (Year: 2014).*

Machine Translation and Abstract of Chinese Publication No. CN103391529, dated Nov. 13, 2013, 13 pages.

"3rd Generation Partnership Project; Technical Specification Group Services and System Aspects; General Packet Radio Service (GPRS) enhancements for Evolved Universal Terrestrial Radio Access Network (E-UTRAN) access Release 13)," 3GPP TS 23.401, V13.0.0, Technical Specification, Sep. 2014, 308 pages.

"3rd Generation Partnership Project; Technical Specification Group Services and System Aspects; Architecture enhancements to facilitate communications with packet data networks and applications (Release 12)," 3GPP TS 23.682, V12.2.0, Technical Specification, Jun. 2014, 32 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.3.0, Technical Specification, Sep. 2014, 215 pages.

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V12.3.0, Technical Specification, Sep. 2014, 378 pages.

Foreign Communication From A Counterpart Application, PCT Application No. PCT/CN2014/090750, English Translation of International Search Report dated Aug. 24, 2015, 3 pages.

Foreign Communication From A Counterpart Application, PCT Application No. PCT/CN2014/090750, English Translation of Written Opinion dated Aug. 24, 2015, 8 pages.

"Advanced EPC—MBB enabling services and improving user experience," XP055401241, Dec. 31, 2013, 18 pages.

China Telecom, et al., "Solution for RAN User Plan Congestion awareness and mitigation," S2-131260 (Merged of 52-131034 and 52-130998), Apr. 8-12, 2013, 7 pages.

Alcatel-Lucent, et al., "Refinement of the RCAF (was RPPF) based Solution for Operator Controlled Off-path Congestion Awareness and Notification," S2-132975 (revision of S2-132860), Jul. 15-19, 2013, 4 pages.

Foreign Communication From A Counterpart Application, European Application No. 14905854.7, Extended European Search Report dated Sep. 6, 2017, 10 pages.

* cited by examiner

CONGESTION NOTIFICATION METHOD, RELATED DEVICE, AND SYSTEM

CROSS-REFERENCE TO RELATED APPLICATIONS

This application is a continuation of International Patent Application No. PCT/CN2014/090750 filed on Nov. 10, 2014, which is hereby incorporated by reference in its entirety.

TECHNICAL FIELD

Embodiments of the present disclosure relate to the field of communications technologies, and in particular, to a congestion notification method, a related device, and a system.

BACKGROUND

When a network in an area is congested, a service provided by an application server for user equipment (UE) in the area is affected. For example, a service transmission delay increases, service bearer establishment fails, and a transmission rate is limited. Because the application server cannot perceive a congestion status, the application server continues performing downlink data transmission, which causes a waste of a network resource and may lead to a failure to properly use some important services due to a poor network condition.

SUMMARY

To resolve the foregoing problem, embodiments of the present disclosure provide a congestion notification method, a related device, and a system such that an application server can learn in time a case in which congestion occurs. Therefore, the application server may adjust, according to the congestion situation, a related service in an area corresponding to the congestion situation.

According to a first aspect, an embodiment of the present disclosure provides a congestion notification method, where the method includes receiving, by a network side device, a congestion status of a target network area and that is sent by a radio access network (RAN) congestion awareness function (RCAF) entity, where the target network area is a network area involved in an application service provided by a target application server, and sending, by the network side device, the congestion status of the target network area to the target application server.

With reference to the first aspect, in a first possible implementation manner, before receiving, by a network side device, a congestion status of a target network area from an RCAF entity, the method further includes receiving, by the network side device, a first congestion query request from the target application server, where the first congestion query request includes information about a target area, and the first congestion query request requests to acquire a congestion status of the target area, determining, by the network side device according to the information about the target area, an identifier of the target network area and related to the target area, and sending, by the network side device, a second congestion query request to the RCAF entity, where the second congestion query request includes the identifier of the target network area, and the second congestion query request requests to acquire the congestion status of the target network area.

With reference to the first possible implementation manner of the first aspect, in a second possible implementation manner of the first aspect, the information about the target area is information about a target geographic area, where the information about the target geographic area is information about an area not divided by an operator and that cannot be identified by the network side device.

With reference to the second possible implementation manner of the first aspect, in a third possible implementation manner of the first aspect, determining, by the network side device according to the information about the target area, an identifier of the target network area and related to the target area includes determining, by the network side device according to a mapping relationship between the information about the target geographic area and the identifier of the target network area, the identifier of the target network area corresponding to the information about the target geographic area.

With reference to the second possible implementation manner of the first aspect, in a fourth possible implementation manner of the first aspect, determining, by the network side device according to the information about the target area, an identifier of the target network area related to the target area includes sending, by the network side device, the information about the target geographic area to an interworking function (IWF) entity, and receiving, by the network side device, the identifier of the target network area from the IWF entity.

With reference to any possible implementation manner of the first possible implementation manner of the first aspect to the fourth possible implementation manner of the first aspect, in a fifth possible implementation manner of the first aspect, the first congestion query request further includes service content description information of a target application, and the method further includes determining, by the network side device according to the service content description information of the target application, a congestion status of an application in the target network area and that matches the target application, and sending, to the target application server, the congestion status of the application in the target network area and that matches the target application.

With reference to the fifth possible implementation manner of the first aspect, in a sixth possible implementation manner of the first aspect, the service content description information of the target application is an identifier of the target application, or an identifier of a group corresponding to the target application.

With reference to the first aspect or any one of the foregoing possible implementation manners of the first aspect, in a seventh possible implementation manner of the first aspect, the network side device is a service capability exposure function (SCEF) entity, or the network side device is a policy and charging rules function (PCRF) entity.

According to a second aspect, an embodiment of the present disclosure provides a congestion notification method, where the method includes sending, by an application server, a congestion query request to a network side device, where the congestion query request includes information about a target area, and the congestion query request requests to acquire a congestion status of the target area, receiving, by the application server, a congestion status of a target network area and related to the target area from the network side device, and adjusting, by the application server, a running status of an application according to the congestion status of the target network area.

With reference to the second aspect, in a first possible implementation manner of the second aspect, the information about the target area is an identifier of the target network area, or the information about the target area is information about a target geographic area, where the information about the target geographic area is information about an area not divided by an operator and that cannot be identified by the network side device.

With reference to the second aspect or the first possible implementation manner of the second aspect, in a second possible implementation manner of the second aspect, the congestion query request further includes service content description information of a target application, and the method further includes receiving, by the application server, a congestion status of an application in the target network area and that matches the target application, where the congestion status is sent by the network side device.

With reference to the second possible implementation manner of the second aspect, in a third possible implementation manner of the second aspect, the service content description information of the target application is an identifier of the target application, or an identifier of a group corresponding to the target application.

According to a third aspect, an embodiment of the present disclosure provides a congestion notification method, where the method includes acquiring, by an RCAF entity, an identifier of a target network area, where the target network area is a network area involved in an application service provided by a target application server, acquiring, by the RCAF entity, a congestion status of the target network area, and sending, by the RCAF entity, the congestion status of the target network area to a network side device.

With reference to the third aspect, in a first possible implementation manner of the third aspect, acquiring, by the RCAF entity, the target network area includes receiving, by the RCAF entity, a congestion query request from the network side device, where the congestion query request includes the identifier of the target network area, and the congestion query request requests to acquire the congestion status of the target network area.

With reference to the third aspect, in a second possible implementation manner of the third aspect, acquiring, by the RCAF unit, the target network area includes determining, by the RCAF unit, the identifier of the target network area from a subscription list, where the subscription list includes information about a network area and that can provide a congestion status.

According to a fourth aspect, an embodiment of the present disclosure provides a congestion notification method, where the method includes receiving, by an IWF entity, information about a target geographic area from a network side device, where the information about the target geographic area is information about an area not divided by an operator and that cannot be identified by the network side device, determining, by the IWF entity according to a mapping relationship between an identifier of a target network area and the information about the target geographic area, the identifier of the target network area and that corresponds to the information about the target geographic area, and sending, by the IWF entity, the identifier of the target network area to the network side device.

According to a fifth aspect, an embodiment of the present disclosure provides a network side device, where the network side device includes a receiving unit configured to receive a congestion status of a target network area from an RCAF entity, where the target network area is a network area involved in an application service provided by a target application server, and a sending unit configured to send the congestion status of the target network area to the target application server.

With reference to the fifth aspect, in a first possible implementation manner of the fifth aspect, the receiving unit is further configured to receive a first congestion query request from the target application server, where the first congestion query request includes information about a target area, and the first congestion query request requests to acquire a congestion status of the target area, and the network side device further includes a determining unit, where the determining unit is configured to determine, according to the information about the target area, an identifier of the target network area and related to the target area, and the sending unit is further configured to send a second congestion query request to the RCAF entity, where the second congestion query request includes the identifier of the target network area, and the second congestion query request requests to acquire the congestion status of the target network area.

With reference to the first possible implementation manner of the fifth aspect, in a second possible implementation manner of the fifth aspect, the information about the target area is information about a target geographic area, where the information about the target geographic area is information about an area not divided by an operator and that cannot be identified by the network side device.

With reference to the second possible implementation manner of the fifth aspect, in a third possible implementation manner of the fifth aspect, the determining unit is further configured to determine, according to a mapping relationship between the information about the target geographic area and the identifier of the target network area, the identifier of the target network area and that corresponds to the information about the target geographic area.

With reference to the second possible implementation manner of the fifth aspect, in a fourth possible implementation manner of the fifth aspect, the determining unit is further configured to send the information about the target geographic area to an IWF entity using the sending unit, and the determining unit is further configured to determine that the identifier of the target network area is received by the receiving unit from the IWF entity.

With reference to the first possible implementation manner of the fifth aspect to the fourth possible implementation manner of the fifth aspect, in a fifth possible implementation manner of the fifth aspect, the first congestion query request further includes service content description information of a target application. The determining unit is further configured to determine, according to the service content description information of the target application, a congestion status of an application in the target network area and that matches the target application, and the sending unit is further configured to send, to the target application server, the congestion status of the application in the target network area and that matches the target application.

With reference to the fifth possible implementation manner of the fifth aspect, in a sixth possible implementation manner of the fifth aspect, the service content description information of the target application is an identifier of the target application, or an identifier of a group corresponding to the target application.

With reference to the fifth aspect or any one of the foregoing possible implementation manners of the fifth aspect, in a seventh possible implementation manner of the fifth aspect, the network side device is an SCEF entity, or the network side device is a PCRF entity.

According to a sixth aspect, an embodiment of the present disclosure provides an application server, where the application server includes a sending unit configured to send a congestion query request to a network side device, where the congestion query request includes information about a target area, and the congestion query request requests to acquire a congestion status of the target area, a receiving unit configured to receive a congestion status of a target network area and related to the target area from the network side device, and a determining unit configured to adjust a running status of an application according to the congestion status of the target network area.

With reference to the sixth aspect, in a first possible implementation manner of the sixth aspect, the information about the target area is an identifier of the target network area, or the information about the target area is information about a target geographic area, where the information about the target geographic area is information about an area not divided by an operator and that cannot be identified by the network side device.

With reference to the sixth aspect or the first possible implementation manner of the sixth aspect, in a second possible implementation manner of the sixth aspect, the congestion query request further includes service content description information of a target application, and the receiving unit is further configured to receive a congestion status of an application in the target network area and that matches the target application, where the congestion status is sent by the network side device.

With reference to the second possible implementation manner of the sixth aspect, in a third possible implementation manner of the sixth aspect, the service content description information of the target application is an identifier of the target application, or an identifier of a group corresponding to the target application.

According to a seventh aspect, an embodiment of the present disclosure provides an RCAF entity, where the RCAF entity includes an acquiring unit configured to acquire an identifier of a target network area, where the target network area is a network area involved in an application service provided by a target application server, where the acquiring unit is further configured to acquire a congestion status of the target network area, and a sending unit configured to send the congestion status of the target network area to a network side device.

With reference to the seventh aspect, in a first possible implementation manner of the seventh aspect, the acquiring unit is further configured to receive a congestion query request from the network side device, where the congestion query request includes the identifier of the target network area, and the congestion query request requests to acquire the congestion status of the target network area.

With reference to the seventh aspect, in a second possible implementation manner of the seventh aspect, the acquiring unit is further configured to determine the identifier of the target network area from a subscription list, where the subscription list includes information about a network area and that can provide a congestion status.

According to an eighth aspect, an embodiment of the present disclosure provides an IWF entity, where the IWF entity includes a receiving unit configured to receive information about a target geographic area from a network side device, where the information about the target geographic area is information about an area not divided by an operator and that cannot be identified by the network side device, a determining unit configured to determine, according to a mapping relationship between an identifier of a target network area and the information about the target geographic area, the identifier of the target network area and that corresponds to the information about the target geographic area, and a sending unit configured to send the identifier of the target network area to the network side device.

According to a ninth aspect, an embodiment of the present disclosure provides a network side device, where the network side device includes a receiver configured to receive a congestion status of a target network area from an RCAF entity, where the target network area is a network area involved in an application service provided by a target application server, and a transmitter configured to send the congestion status of the target network area to the target application server.

With reference to the ninth aspect, in a first possible implementation manner of the ninth aspect, the receiver is further configured to receive a first congestion query request from the target application server, where the first congestion query request includes information about a target area, and the first congestion query request requests to acquire a congestion status of the target area, and the network side device further includes a processor, where the processor is configured to determine, according to the information about the target area, an identifier of the target network area and related to the target area, and the transmitter is further configured to send a second congestion query request to the RCAF entity, where the second congestion query request includes the identifier of the target network area, and the second congestion query request requests to acquire the congestion status of the target network area.

With reference to the first possible implementation manner of the ninth aspect, in a second possible implementation manner of the ninth aspect, the information about the target area is information about a target geographic area, where the information about the target geographic area is information about an area not divided by an operator and that cannot be identified by the network side device.

With reference to the second possible implementation manner of the ninth aspect, in a third possible implementation manner of the ninth aspect, the processor is further configured to determine, according to a mapping relationship between the information about the target geographic area and the identifier of the target network area, the identifier of the target network area corresponding to the information about the target geographic area.

With reference to the second possible implementation manner of the ninth aspect, in a fourth possible implementation manner of the ninth aspect, the processor is further configured to send the information about the target geographic area to an IWF entity using the transmitter, and the processor is further configured to determine that the identifier of the target network area is received by the receiver from the IWF entity.

With reference to any possible implementation manner of the first possible implementation manner of the ninth aspect to the fourth possible implementation manner of the ninth aspect, in a fifth possible implementation manner of the ninth aspect, the first congestion query request further includes service content description information of a target application. The processor is further configured to determine, according to the service content description information of the target application, a congestion status of an application in the target network area and that matches the target application, and the transmitter is further configured to send, to the target application server, the congestion status of the application in the target network area and that matches the target application.

With reference to the fifth possible implementation manner of the ninth aspect, in a sixth possible implementation manner of the ninth aspect, the service content description information of the target application is an identifier of the target application, or an identifier of a group corresponding to the target application.

With reference to the ninth aspect or any one of the foregoing possible implementation manners of the ninth aspect, in a seventh possible implementation manner of the ninth aspect, the network side device is an SCEF entity, or the network side device is a PCRF entity.

According to a tenth aspect, an embodiment of the present disclosure provides an application server, where the application server includes a transmitter configured to send a congestion query request to a network side device, where the congestion query request includes information about a target area, and the congestion query request requests to acquire a congestion status of the target area, a receiver configured to receive a congestion status of a target network area and related to the target area from the network side device, and a processor configured to adjust a running status of an application according to the congestion status of the target network area.

With reference to the tenth aspect, in a first possible implementation manner of the tenth aspect, the information about the target area is an identifier of the target network area, or the information about the target area is information about a target geographic area, where the information about the target geographic area is information about an area not divided by an operator and that cannot be identified by the network side device.

With reference to the tenth aspect or the first possible implementation manner of the tenth aspect, in a second possible implementation manner of the tenth aspect, the congestion query request further includes service content description information of a target application, and the receiver is further configured to receive a congestion status of an application in the target network area and that matches the target application, where the congestion status is sent by the network side device.

With reference to the second possible implementation manner of the tenth aspect, in a third possible implementation manner of the tenth aspect, the service content description information of the target application is an identifier of the target application, or an identifier of a group corresponding to the target application.

According to an eleventh aspect, an embodiment of the present disclosure provides an RCAF entity, where the RCAF entity includes a processor configured to acquire an identifier of a target network area, where the target network area is a network area involved in an application service provided by a target application server, where the processor is further configured to acquire a congestion status of the target network area, and a transmitter configured to send the congestion status of the target network area to a network side device.

With reference to the eleventh aspect, in a first possible implementation manner of the eleventh aspect, the RCAF entity further includes a receiver, where the receiver is configured to receive a congestion query request from the network side device, the congestion query request includes the identifier of the target network area, and the congestion query request requests to acquire the congestion status of the target network area, and the processor is further configured to determine the identifier of the target network area according to the congestion query request.

With reference to the eleventh aspect, in a second possible implementation manner of the eleventh aspect, the processor is further configured to determine the identifier of the target network area from a subscription list, where the subscription list includes information about a network area and that can provide a congestion status.

According to a twelfth aspect, an embodiment of the present disclosure provides an IWF entity, where the IWF entity includes a receiver configured to receive information about a target geographic area from a network side device, where the information about the target geographic area is information about an area not divided by an operator and that cannot be identified by the network side device, a processor configured to determine, according to a mapping relationship between an identifier of a target network area and the information about the target geographic area, the identifier of the target network area and that corresponds to the information about the target geographic area, and a transmitter configured to send the identifier of the target network area to the network side device.

According to a thirteenth aspect, an embodiment of the present disclosure provides a congestion notification system, where the system includes any network side device according to the ninth aspect to the seventh possible implementation manner of the ninth aspect and any RCAF entity according to the eleventh aspect to the second possible implementation manner of the eleventh aspect.

With reference to the thirteenth aspect, in a first possible implementation manner of the thirteenth aspect, the system further includes the IWF entity according to the twelfth aspect.

In the foregoing technical solutions, when a congestion status of a target network area is acquired, a network side device may directly send the congestion status to a target application server configured to provide an application service for the target network area. In this way, the target application server may adjust, in time according to the congestion status, a running status of an application corresponding to the target network area. For example, a measure may be applied for, such as improving quality of service, reducing transmission bandwidth, or suspending a transmission service. In this way, a waste of a network resource may be reduced or user experience may be improved.

BRIEF DESCRIPTION OF DRAWINGS

To describe the technical solutions in the embodiments of the present disclosure more clearly, the following briefly describes the accompanying drawings required for describing the embodiments of the present disclosure, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be understood that the technical solutions in the embodiments of the present disclosure may be applied to a Long Term Evolution (LTE) system.

UE also referred to as a mobile terminal (MT), mobile UE, and the like, may communicate with one or more core networks using a RAN. The UE may be a mobile terminal, such as a mobile phone (also referred to as a "cellular" phone) and a computer with a mobile terminal. For example, the UE may be a portable, pocket-sized, handheld, computer built-in, or in-vehicle mobile apparatus.

Figure 1:
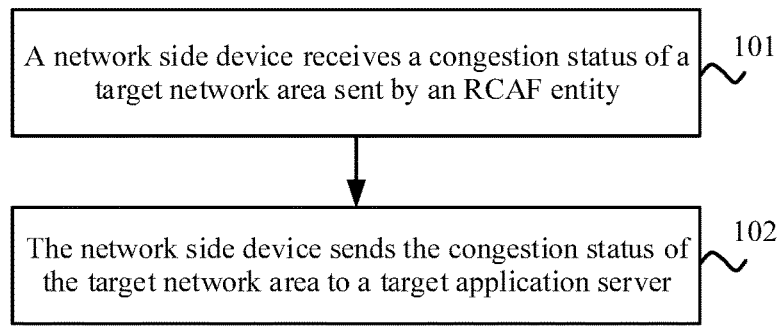
FIG. 1 is a schematic flowchart of a congestion notification method according to an embodiment of the present disclosure.

FIG. 1 is a schematic flowchart of a congestion notification method according to an embodiment of the present disclosure. The method includes the following steps.

Step 101: A network side device receives a congestion status of a target network area and sent by an RCAF entity, where the target network area is a network area involved in an application service provided by a target application server.

Step 102: The network side device sends the congestion status of the target network area to the target application server.

According to the method shown in FIG. 1, when a congestion status of a target network area is acquired, a network side device may directly send the congestion status to a target application server configured to provide an application service for the target network area. In this way, the target application server may adjust, in time according to the congestion status, a running status of an application corresponding to the target network area. For example, a measure may be applied for, such as improving quality of service (QoS), reducing transmission bandwidth, or suspending a transmission service. In this way, a waste of a network resource may be reduced or user experience may be improved.

Optionally, as an embodiment, before the network side device receives the congestion status of the target network area and sent by the RCAF entity, the method further includes receiving, by the network side device, a first congestion query request sent by the target application server, where the first congestion query request includes information about a target area, and the first congestion query request requests to acquire a congestion status of the target area, determining, by the network side device according to the information about the target area, an identifier of the target network area and related to the target area, and sending, by the network side device, a second congestion query request to the RCAF entity, where the second congestion query request includes the identifier of the target network area, and the second congestion query request requests to acquire the congestion status of the target network area.

The information about the target area may be the identifier of the target network area or information about a target geographic area. The information about the target area is information about an area involved in an application service provided by the application server. Further, the information about the target network area is information about an area, such as a cell or a tracking area, divided by an operator and that can be identified by the network side device. The information about the target geographic area is information about an area not divided by an operator and that cannot be identified by the network side device, such as longitude and latitude information and a street name.

When the information about the target area is the identifier of the target network area, the network side device may directly determine identifier of the target network area. When the information about the target area is the information about the target geographic area, the network side device needs to determine the identifier of the target network area according to the information about the target geographic area.

Optionally, as an embodiment, when the information about the target area is the information about the target geographic area, determining, by the network side device according to the information about the target area, an identifier of the target network area and related to the target area includes determining, by the network side device according to a mapping relationship between the information about the target geographic area and the identifier of the target network area, the identifier of the target network area corresponding to the information about the target geographic area.

Optionally, as another embodiment, when the information about the target area is the information about the target geographic area, determining, by the network side device according to the information about the target area, an identifier of the target network area and related to the target area includes sending, by the network side device, the information about the target geographic area to an IWF entity, and receiving, by the network side device, the identifier of the target network area sent by the IWF entity.

Optionally, the network side device may send a network area query request message to the IWF entity, where the network area query request message includes the information about the target geographic area. After determining an identifier of a corresponding target network area, the IWF entity may send a network area query response message to the network side device, where the network area query response message includes the identifier of the target network area.

Further, the first congestion query request may further include service content description information of a target application. In this case, the network side device determines, according to the service content description information of the target application, a congestion status of an application in the target network area and that matches the target application, and sends, to the target application server, the congestion status of the application in the target network area and that matches the target application. Further, the service content description information of the target application is an identifier of the target application, or an identifier of a group corresponding to the target application.

Optionally, the network side device is an SCEF entity, or the network side device is a PCRF entity.

Persons skilled in the art may understand that the RCAF entity mentioned in this embodiment of the present disclosure may also be referred to as an RCAF unit, the SCEF entity mentioned in this embodiment of the present disclosure may also be referred to as an SCEF unit, and the IWF entity mentioned in this embodiment of the present disclosure may also be referred to as an IWF unit.

Figure 2:
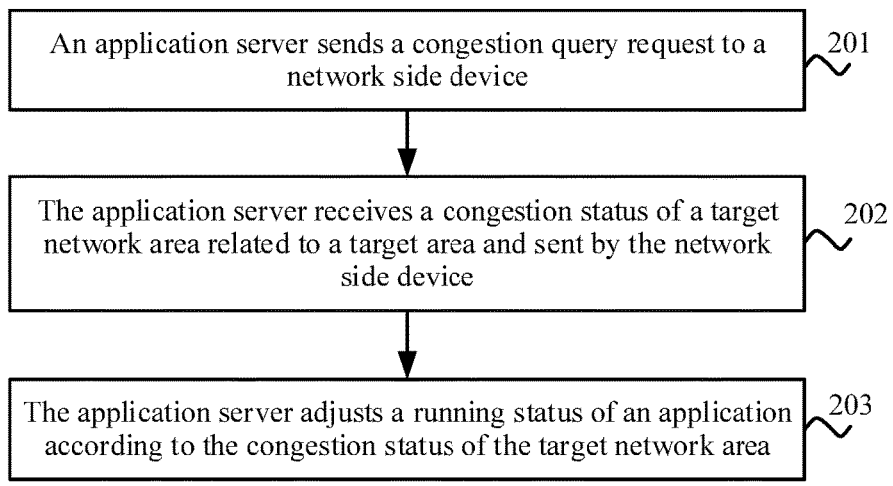
FIG. 2 is a schematic flowchart of a congestion notification method according to an embodiment of the present disclosure.

FIG. 2 is a schematic flowchart of a congestion notification method according to an embodiment of the present disclosure. The method includes the following steps.

Step 201: An application server sends a congestion query request to a network side device, where the congestion query request includes information about a target area, the congestion query request requests to acquire a congestion status of the target area, and the target area is an area involved in an application service provided by the application server.

Step 202: The application server receives a congestion status of a target network area related to the target area and sent by the network side device.

Step 203: The application server adjusts a running status of an application according to the congestion status of the target network area.

According to the method shown in FIG. 2, an application server may acquire in time a congestion status of a network area involved in a provided application service. In this way, the application server may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, the information about the target area is an identifier of the target network area, or the information about the target area is information about a target geographic area. Further, the information about the target network area is information about an area, such as a cell or a tracking area, that is divided by an operator and that can be identified by the network side device. The information about the target geographic area is information about an area not divided by an operator and that cannot be identified by the network side device, such as longitude and latitude information and a street name.

Further, the congestion query request further includes service content description information of a target application. The application server receives a congestion status of an application in the target network area and that matches the target application, where the congestion status is sent by the network side device. Further, the service content description information of the target application is an identifier of the target application, or an identifier of a group corresponding to the target application.

Optionally, the network side device is an SCEF entity, or the network side device is a PCRF entity.

Figure 3:
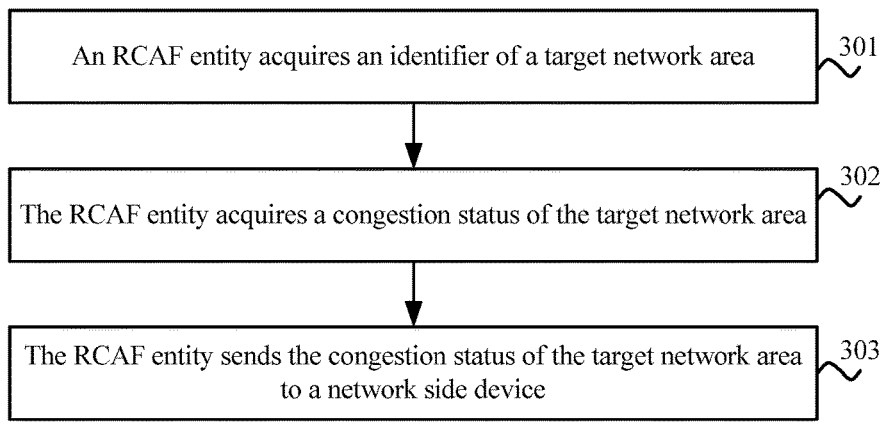
FIG. 3 is a schematic flowchart of a congestion notification method according to an embodiment of the present disclosure.

FIG. 3 is a schematic flowchart of a congestion notification method according to an embodiment of the present disclosure.

Step 301: An RCAF entity acquires an identifier of a target network area, where the target network area is a network area involved in an application service provided by a target application server.

Step 302: The RCAF entity acquires a congestion status of the target network area.

Step 303: The RCAF entity sends the congestion status of the target network area to a network side device.

According to the method shown in FIG. 3, an RCAF entity may send in time a congestion status of a specific area to a network side device such that the network side device forwards the congestion status of the area to a corresponding application server. In this way, the corresponding application server may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, as an embodiment, the RCAF entity acquires the identifier of the target network area includes receiving, by the RCAF entity, a congestion query request sent by the network side device, where the congestion query request includes the identifier of the target network area, and the congestion query request requests to acquire the congestion status of the target network area.

Optionally, as another embodiment, that the RCAF entity acquires the identifier of the target network area includes determining, by the RCAF entity, the identifier of the target network area from a subscription list, where the subscription list includes information about a network area and that can provide a congestion status.

The information about the network area and that may be included in the subscription list includes information about an application server corresponding to the network area (for example, an identifier of a corresponding application server) and related information of the network area (for example, an identifier of the network area).

Optionally, the network side device is an SCEF entity, or the network side device is a PCRF entity.

Figure 4:
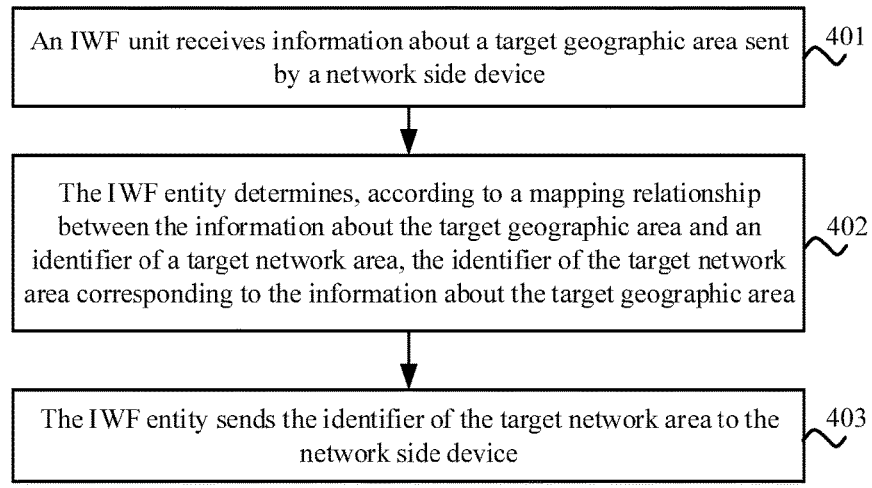
FIG. 4 is a schematic flowchart of a congestion notification method according to an embodiment of the present disclosure.

FIG. 4 is a schematic flowchart of a congestion notification method according to an embodiment of the present disclosure. The method includes the following steps.

Step 401: An IWF entity receives information about a target geographic area sent by a network side device, where the information about the target geographic area is information about an area not divided by an operator and that cannot be identified by the network side device.

Step 402: The IWF entity determines, according to a mapping relationship between the information about the target geographic area and an identifier of a target network area, the identifier of the target network area corresponding to the information about the target geographic area.

Step 403: The IWF entity sends the identifier of the target network area to the network side device.

According to the method shown in FIG. 4, an IWF entity may convert information about a geographic area that cannot be identified by a network side device into an identifier of a network area that can be identified by the network side device. In this way, assistance may be provided for the network side device in determining a network area in which congestion occurs.

Figure 5:
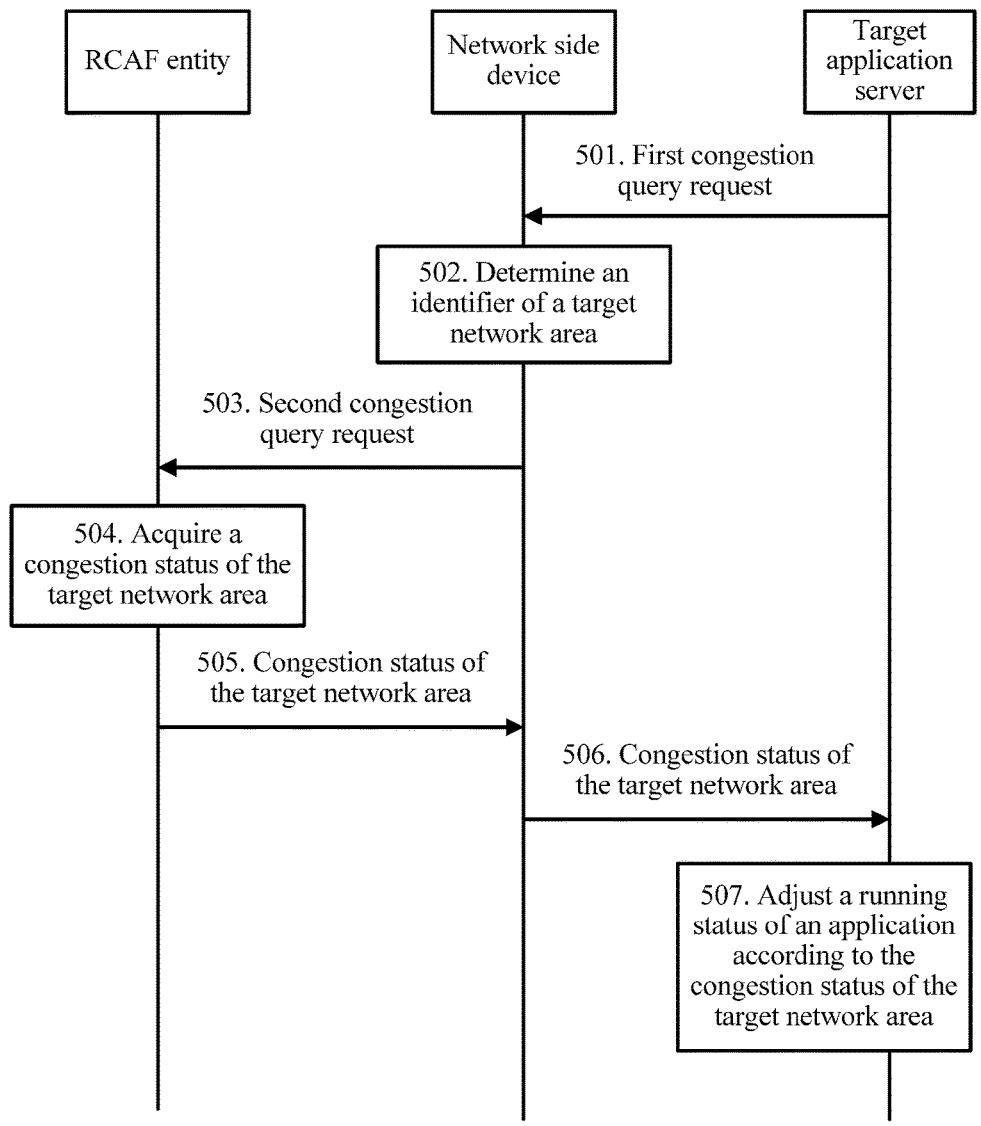
FIG. 5 is a schematic flowchart of a congestion notification method according to an embodiment of the present disclosure.
Figure 6:
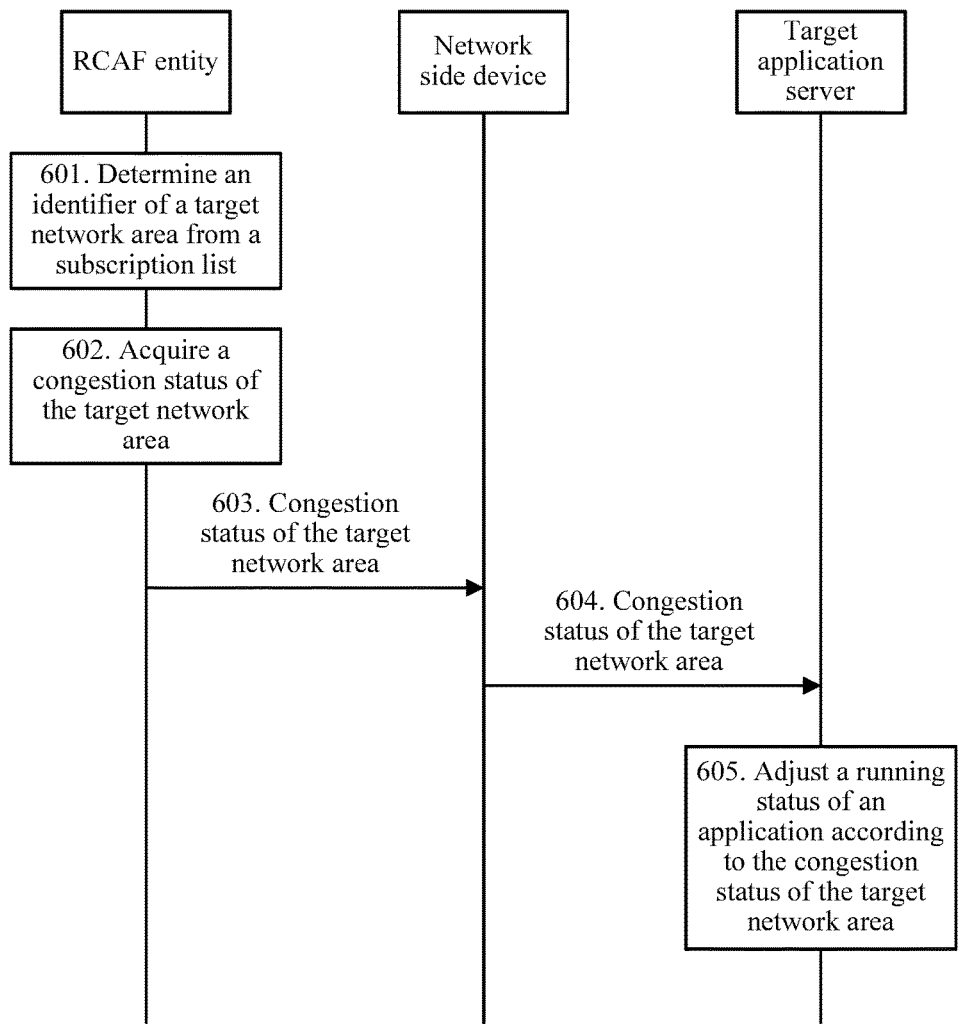
FIG. 6 is a schematic flowchart of a congestion notification method according to another embodiment of the present disclosure.

To help persons skilled in the art better understand the present disclosure, the following further describes the present disclosure with reference to specific embodiments in FIG. 5 and FIG. 6.

FIG. 5 is a schematic flowchart of a congestion notification method according to an embodiment of the present disclosure. The method include the following steps.

Step 501: A target application server sends a first congestion query request to a network side device, where the first congestion query request includes information about a target area, the first congestion query request requests to acquire a congestion status of the target area, and the target area is an area involved in an application service provided by the application server.

Optionally, the information about the target area is an identifier of a target network area, or the information about the target area is information about a target geographic area. Further, the identifier of the target network area is an identifier of an area, such as a cell or a tracking area, divided by an operator and that can be identified by a network side device. The information about the target geographic area is information about an area not divided by an operator and that cannot be identified by the network side device, such as longitude and latitude information and a street name.

Persons skilled in the art may understand that the network side device may acquire an identifier of the target application server in order to determine the target application server according to the identifier of the target application server. The identifier of the target application server identifies the target application server. The identifier of the target application server may be a name of the target application server, the identifier of the target application server may also be an Internet Protocol (IP) address of the target application server, the identifier of the target application server may also be a Media Access Control (MAC) address of the target application server, and so on.

Step 502: The network side device determines an identifier of a target network area according to the first congestion query request.

Optionally, as an embodiment, when the information about the target area is the information about the target geographic area, the network side device may determine, according to a mapping relationship between the identifier of the target network area and the information about the target geographic area, the identifier of the target network area corresponding to the information about the target geographic area.

Optionally, as another embodiment, when the information about the target area is the information about the target geographic area, the network side device sends the information about the target geographic area to an IWF entity. The network side device receives the identifier of the target network area sent by the IWF entity. In other words, the IWF entity may determine, according to a mapping relationship between the identifier of the target network area and the information about the target geographic area, the identifier of the target network area corresponding to the information about the target geographic area.

Certainly, when the information about the target area is the identifier of the target network area, the network side device may directly determine the identifier of the target network area.

Step 503: The network side device sends a second congestion query request to an RCAF entity, where the second congestion query request includes the identifier of the target network area, and the second congestion query request requests to acquire a congestion status of the target network area.

Step 504: The RCAF entity acquires the congestion status of the target network area.

Further, the RCAF entity queries a UE list of a corresponding area using a mobility management entity (MME). Further, the RCAF entity may send, to the MME, a congestion area corresponding to related information of the congestion area. The MME returns a UE identifier list of the congestion area corresponding to the related information of the congestion area. The RCAF entity determines, according to the UE identifier list, a congestion situation of the congestion area corresponding to the related information of the congestion area. If the RCAF entity determines that congestion occurs in the target network area, the RCAF determines that the congestion status of the target network area includes a congestion level. If the RCAF entity determines that congestion is to occur in the target network area, the RCAF entity may determine that the congestion status of the target network area includes a predicted congestion level or other information (for example, time at which congestion may occur).

Step 505: The RCAF entity sends the congestion status of the target network area to the network side device.

Step 506: The network side device sends the congestion status of the target network area to the target application server.

Step 507: The target application server adjusts a running status of an application according to the congestion status of the target network area.

Further, the first congestion query request may further include service content description information of a target application. In this case, the network side device determines, according to the service content description information of the target application, a congestion status of an application in the target network area and that matches the target application, and sends, to the target application server, the congestion status of the application in the target network area and that matches the target application. Further, the service content description information of the target application is an identifier of the target application, or an identifier of a group corresponding to the target application.

Optionally, the network side device is an SCEF entity, or the network side device is a PCRF entity.

According to the method shown in FIG. 5, when a congestion status of a target network area is acquired, a network side device may directly send the congestion status to a corresponding application server. In this way, the application server may adjust in time a running status of a corresponding application service according to the congestion status. For example, a measure may be applied for, such as improving QoS, reducing transmission bandwidth, or suspending a transmission service. In this way, a waste of a network resource may be reduced or user experience may be improved.

FIG. 6 is a schematic flowchart of a congestion notification method according to another embodiment of the present disclosure.

Step 601: An RCAF entity determines an identifier of a target network area from a subscription list, where the subscription list includes information about a network area and that can provide a congestion status.

The information about the network area and that may be included in the subscription list includes information about an application server corresponding to the network area (for example, an identifier of a corresponding application server) and related information of the network area (for example, an identifier of the network area).

The subscription list may be sent by the application server to the RCAF entity using a subscription message. The subscription message may include the related information of the network area (for example, the identifier of the network area), the information about the application server corresponding to the network area (for example, the identifier of the corresponding application server), and the like. The subscription list may also be preconfigured and stored in the RCAF entity.

Step 602: The RCAF entity acquires a congestion status of the target network area.

Further, the RCAF entity queries a UE list of a corresponding area using an MME. Further, the RCAF entity may send, to the MME, a congestion area corresponding to related information of the congestion area. The MME returns a UE identifier list of the congestion area corresponding to the related information of the congestion area. The RCAF entity determines, according to the UE identifier list, a congestion situation of the congestion area corresponding to the related information of the congestion area. If the RCAF entity determines that congestion occurs in the target network area, the RCAF entity determines that the congestion status of the target network area includes a congestion level. If the RCAF entity determines that congestion is to occur in the target network area, the RCAF entity may determine that the congestion status of the target network area includes a predicted congestion level or other information (for example, time at which congestion may occur).

Step 603: The RCAF entity sends the congestion status of the target network area to a network side device.

Step 604: The network side device sends the congestion status of the target network area to a target application server, where the target network area is a network area involved in an application service provided by the target application server.

Before sending the congestion status of the target network area to the target application server, the network side device needs to determine an application server corresponding to the target network area. The network side device may determine, using multiple methods, a target application server corresponding to the target network area. For example, a correspondence between the network area and the application server may be stored in the network side device, and the network side device may determine the target application server according to the correspondence between the network area and the application server. For another example, the subscription list stored in the RCAF entity may include the correspondence between the network area and the corresponding application server. The RCAF entity sends, to the network side device, related information (for example, an identifier of the target application server) of the target application server corresponding to the target network area when sending the congestion status of the target network area to the network side device. The network side device may determine the target application server according to the related information of the target application server sent by the RCAF entity.

Step 605: The target application server adjusts a running status of an application according to the congestion status of the target network area.

Further, the network side device may further acquire service content description information of a target application, where the service content description information of the target application indicates at least one of the target application and target UE corresponding to the target application. In this way, the network side device may match the target application with a service flow or UE in a network area affected by congestion and that corresponds to the target application. The service content description information of the target application may be sent by the target application server to the network side device.

Optionally, the network side device is an SCEF, or the network side device is a PCRF.

According to the method shown in FIG. 6, an RCAF entity may monitor a congestion status of a target network area according to a subscription list, and send in time the congestion status of the target network area to a network side device in a case in which congestion occurs in the target network area. In a case in which the congestion status of the target network area is acquired, the network side device may directly send the congestion status to a corresponding application server. In this way, the application server may adjust in time a running status of a corresponding application service according to the congestion status. For example, a measure may be applied for, such as improving QoS, reducing transmission bandwidth, or suspending a transmission service. In this way, a waste of a network resource may be reduced or user experience may be improved.

Figure 7:
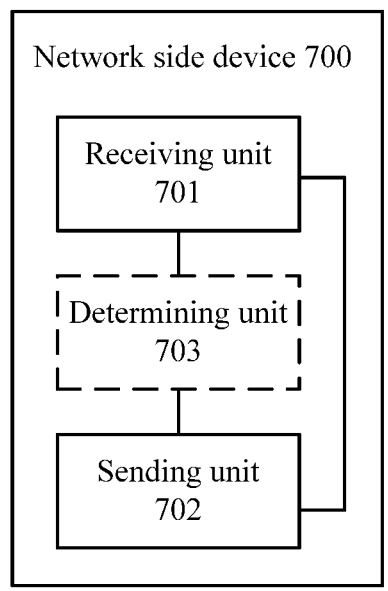
FIG. 7 is a structural block diagram of a network side device according to an embodiment of the present disclosure.

FIG. 7 is a structural block diagram of a network side device according to an embodiment of the present disclosure. As shown in FIG. 7, a network side device 700 includes a receiving unit 701 and a sending unit 702.

The receiving unit 701 is configured to receive a congestion status of a target network area sent by an RCAF entity, where the target network area is a network area involved in an application service provided by a target application server.

The sending unit 702 is configured to send the congestion status of the target network area to the target application server.

When a congestion status of a target network area is acquired, the network side device 700 shown in FIG. 7 may directly send the congestion status to a target application server configured to provide an application service for the target network area. In this way, the target application server may adjust, in time according to the congestion status, a running status of an application corresponding to the target network area. For example, a measure may be applied for, such as improving QoS, reducing transmission bandwidth, or suspending a transmission service. In this way, a waste of a network resource may be reduced or user experience may be improved.

Optionally, as an embodiment, the receiving unit 701 is further configured to receive a first congestion query request sent by the target application server, where the first congestion query request includes information about a target area, and the first congestion query request requests to acquire a congestion status of the target area. The network side device 700 further includes a determining unit 703. The determining unit 703 is configured to determine, according to the information about the target area, an identifier of the target network area related to the target area. The sending unit 702 is further configured to send a second congestion query request to the RCAF entity, where the second congestion query request includes the identifier of the target network area, and the second congestion query request requests to acquire the congestion status of the target network area.

Optionally, the information about the target area is information about a target geographic area, where the information about the target geographic area is information about an area not divided by an operator and that cannot be identified by the network side device.

Optionally, as an embodiment, the determining unit 703 is further configured to determine, according to a mapping relationship between the information about the target geographic area and the identifier of the target network area, the identifier of the target network area corresponding to the information about the target geographic area.

Optionally, as another embodiment, the determining unit 703 is further configured to send the information about the target geographic area to an IWF entity using the sending unit 702. The determining unit 703 is further configured to determine that the identifier of the target network area is received by the receiving unit 701 from the IWF entity.

The first congestion query request further includes service content description information of a target application. The determining unit 703 is further configured to determine, according to the service content description information of the target application, a congestion status of an application in the target network area and that matches the target application. The sending unit 702 is further configured to send, to the target application server, the congestion status of the application in the target network area and that matches the target application.

Further, the service content description information of the target application is an identifier of the target application, or an identifier of a group corresponding to the target application.

Further, the network side device 700 is an SCEF entity, or the network side device 700 is a PCRF entity.

Figure 8:
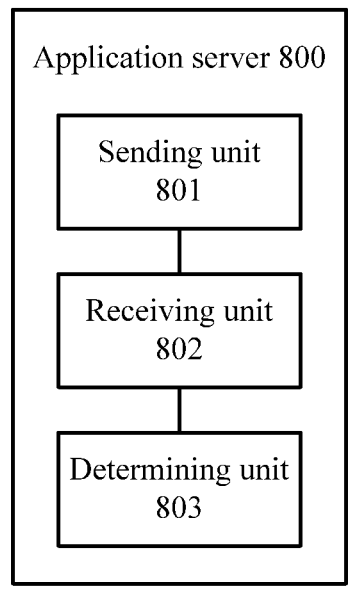
FIG. 8 is a structural block diagram of an application server according to an embodiment of the present disclosure.

FIG. 8 is a structural block diagram of an application server according to an embodiment of the present disclosure. As shown in FIG. 8, an application server 800 includes a sending unit 801, a receiving unit 802, and a determining unit 803.

The sending unit 801 is configured to send a congestion query request to a network side device, where the congestion query request includes information about a target area, and the congestion query request requests to acquire a congestion status of the target area.

The receiving unit 802 is configured to receive a congestion status of a target network area related to the target area and sent by the network side device.

The determining unit 803 is configured to adjust a running status of an application according to the congestion status of the target network area.

The application server 800 shown in FIG. 8 may acquire in time a congestion status of a network area involved in a provided application service. In this way, the application server 800 may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, the information about the target area is an identifier of the target network area, or the information about the target area is information about a target geographic area, where the information about the target geographic area is information about an area not divided by an operator and that cannot be identified by the network side device.

The congestion query request further includes service content description information of a target application, and the receiving unit 802 is further configured to receive a congestion status of an application in the target network area and that matches the target application, where the congestion status is sent by the network side device.

Further, the service content description information of the target application is an identifier of the target application, or an identifier of a group corresponding to the target application.

Figure 9:
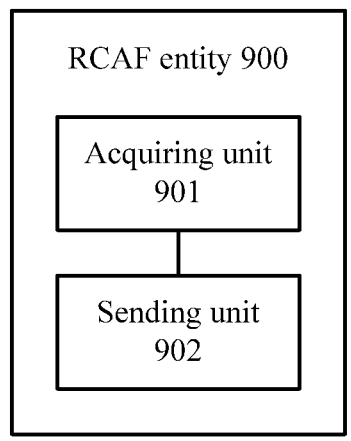
FIG. 9 is a structural block diagram of an RCAF entity according to an embodiment of the present disclosure.

FIG. 9 is a structural block diagram of an RCAF entity according to an embodiment of the present disclosure. As shown in FIG. 9, an RCAF entity 900 includes an acquiring unit 901 and a sending unit 902.

The acquiring unit 901 is configured to acquire an identifier of a target network area, where the target network area is a network area involved in an application service provided by a target application server.

The acquiring unit 901 is further configured to acquire a congestion status of the target network area.

The sending unit 902 is configured to send the congestion status of the target network area to a network side device.

The RCAF entity 900 shown in FIG. 9 may send in time a congestion status of a specific area to a network side device such that the network side device forwards the congestion status of the area to a corresponding application server. In this way, the corresponding application server may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, as an embodiment, the acquiring unit 901 is further configured to receive a congestion query request sent by the network side device, where the congestion query request includes the identifier of the target network area, and the congestion query request requests to acquire the congestion status of the target network area.

Optionally, as another embodiment, the acquiring unit 901 is further configured to determine the identifier of the target network area from a subscription list, where the subscription list includes information about a network area and that can provide a congestion status.

Figure 10:
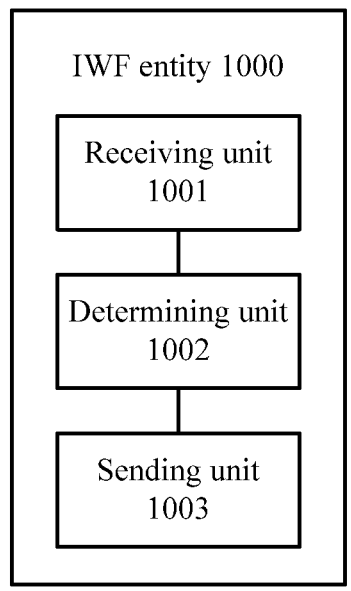
FIG. 10 is a structural block diagram of an IWF entity according to an embodiment of the present disclosure.

FIG. 10 is a structural block diagram of an IWF entity according to an embodiment of the present disclosure. As shown in FIG. 10, an IWF entity 1000 includes a receiving unit 1001, a determining unit 1002, and a sending unit 1003.

The receiving unit 1001 is configured to receive information about a target geographic area sent by a network side device, where the information about the target geographic area is information about an area not divided by an operator and that cannot be identified by the network side device.

The determining unit 1002 is configured to determine, according to a mapping relationship between an identifier of a target network area and the information about the target geographic area, the identifier of the target network area corresponding to the information about the target geographic area.

The sending unit 1003 is configured to send the identifier of the target network area to the network side device.

The IWF entity 1000 shown in FIG. 10 may convert information about a geographic area that cannot be identified by a network side device into an identifier of a network area that can be identified by the network side device. In this way, assistance may be provided for the network side device in determining a network area in which congestion occurs.

Figure 11:
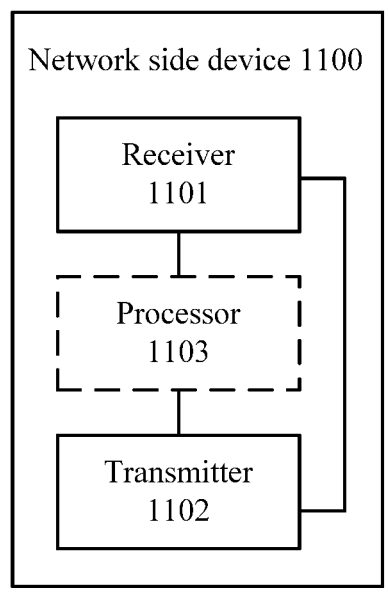
FIG. 11 is a structural block diagram of a network side device according to an embodiment of the present disclosure.

FIG. 11 is a structural block diagram of a network side device according to an embodiment of the present disclosure. As shown in FIG. 11, a network side device 1100 includes a receiver 1101 and a transmitter 1102.

The receiver 1101 is configured to receive a congestion status of a target network area sent by an RCAF entity, where the target network area is a network area involved in an application service provided by a target application server.

The transmitter 1102 is configured to send the congestion status of the target network area to the target application server.

When a congestion status of a target network area is acquired, the network side device 1100 shown in FIG. 11 may directly send the congestion status to a target application server configured to provide an application service for the target network area. In this way, the target application server may adjust, in time according to the congestion status, a running status of an application corresponding to the target network area. For example, a measure may be applied for, such as improving QoS, reducing transmission bandwidth, or suspending a transmission service. In this way, a waste of a network resource may be reduced or user experience may be improved.

Optionally, as an embodiment, the receiver 1101 is further configured to receive a first congestion query request sent by the target application server, where the first congestion query request includes information about a target area, and the first congestion query request requests to acquire a congestion status of the target area. The network side device 1100 further includes a processor 1103. The processor 1103 is configured to determine, according to the information about the target area, an identifier of the target network area related to the target area. The transmitter 1102 is further configured to send a second congestion query request to the RCAF entity, where the second congestion query request includes the identifier of the target network area, and the second congestion query request requests to acquire the congestion status of the target network area.

Optionally, the information about the target area is information about a target geographic area, where the information about the target geographic area is information about an area not divided by an operator and that cannot be identified by the network side device.

Optionally, as an embodiment, the processor 1103 is further configured to determine, according to a mapping relationship between the information about the target geographic area and the identifier of the target network area, the identifier of the target network area corresponding to the information about the target geographic area.

Optionally, as another embodiment, the processor 1103 is further configured to send the information about the target geographic area to an IWF entity using the transmitter 1102. The processor 1103 is further configured to determine that the identifier of the target network area is received by the receiver 1101 from the IWF entity.

The first congestion query request further includes service content description information of a target application, and the processor 1103 is further configured to determine, according to the service content description information of the target application, a congestion status of an application in the target network area and that matches the target application. The transmitter 1102 is further configured to send, to the target application server, the congestion status of the application in the target network area and that matches the target application.

Further, the service content description information of the target application is an identifier of the target application, or an identifier of a group corresponding to the target application.

Further, the network side device 1100 is an SCEF entity, or the network side device 1100 is a PCRF entity.

Figure 12:
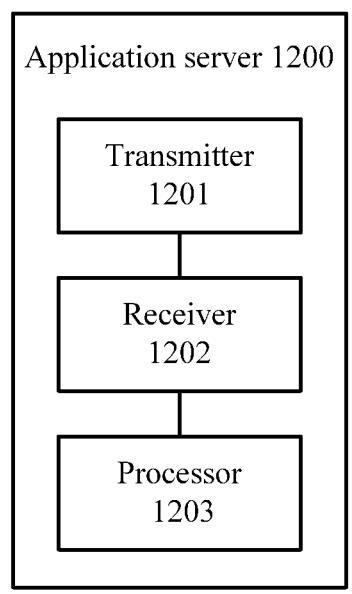
FIG. 12 is a structural block diagram of an application server according to an embodiment of the present disclosure.

FIG. 12 is a structural block diagram of an application server according to an embodiment of the present disclosure. As shown in FIG. 12, an application server 1200 includes a transmitter 1201, a receiver 1202, and a processor 1203.

The transmitter 1201 is configured to send a congestion query request to a network side device, where the congestion query request includes information about a target area, and the congestion query request requests to acquire a congestion status of the target area.

The receiver 1202 is configured to receive a congestion status of a target network area related to the target area and sent by the network side device.

The processor 1203 is configured to adjust a running status of an application according to the congestion status of the target network area.

The application server 1200 shown in FIG. 12 may acquire in time a congestion status of a network area involved in a provided application service. In this way, the application server 1200 may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, the information about the target area is an identifier of the target network area, or the information about the target area is information about a target geographic area, where the information about the target geographic area is information about an area not divided by an operator and that cannot be identified by the network side device.

Further, the congestion query request further includes service content description information of a target application, and the receiver 1202 is further configured to receive a congestion status of an application in the target network area and that matches the target application, where the congestion status is sent by the network side device.

Further, the service content description information of the target application is an identifier of the target application, or an identifier of a group corresponding to the target application.

Figure 13:
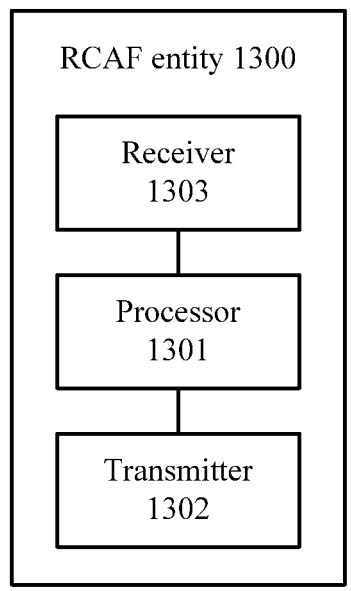
FIG. 13 is a structural block diagram of an RCAF entity according to an embodiment of the present disclosure.

FIG. 13 is a structural block diagram of an RCAF entity according to an embodiment of the present disclosure. As shown in FIG. 13, an RCAF entity 1300 includes a processor 1301 and a transmitter 1302.

The processor 1301 is configured to acquire an identifier of a target network area, where the target network area is a network area involved in an application service provided by a target application server.

The processor 1301 is further configured to acquire a congestion status of the target network area.

The transmitter 1302 is configured to send the congestion status of the target network area to a network side device.

The RCAF entity 1300 shown in FIG. 13 may send in time a congestion status of a specific area to a network side device such that the network side device forwards the congestion status of the area to a corresponding application server. In this way, the corresponding application server may adjust in time a running status of a service according to the congestion status. For example, a measure may be applied for, such as improving QoS, reducing transmission bandwidth, or suspending a transmission service. In this way, a waste of a network resource may be reduced or user experience may be improved.

Optionally, as an embodiment, the RCAF entity 1300 further includes a receiver 1303. The receiver 1303 is configured to receive a congestion query request sent by the network side device, where the congestion query request includes the identifier of the target network area, and the congestion query request requests to acquire the congestion status of the target network area. The processor 1301 is further configured to determine the identifier of the target network area according to the congestion query request.

Optionally, as another embodiment, the processor 1301 is further configured to determine the identifier of the target network area from a subscription list, where the subscription list includes information about a network area and that can provide a congestion status.

Figure 14:
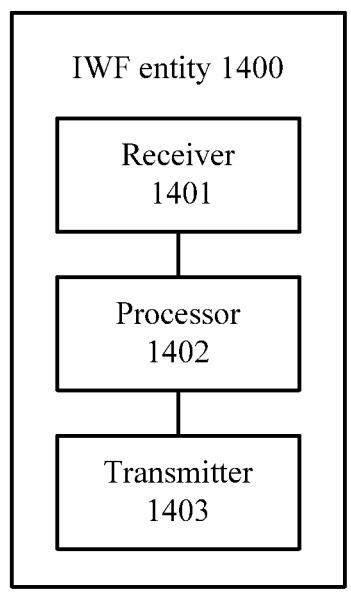
FIG. 14 is a structural block diagram of an IWF entity according to an embodiment of the present disclosure.

FIG. 14 is a structural block diagram of an IWF entity according to an embodiment of the present disclosure. As shown in FIG. 14, an IWF entity 1400 includes a receiver 1401, a processor 1402, and a transmitter 1403.

The receiver 1401 is configured to receive information about a target geographic area sent by a network side device, where the information about the target geographic area is information about an area not divided by an operator and that cannot be identified by the network side device.

The processor 1402 is configured to determine, according to a mapping relationship between an identifier of a target network area and the information about the target geographic area, the identifier of the target network area and that corresponds to the information about the target geographic area.

The transmitter 1403 is configured to send the identifier of the target network area to the network side device.

The IWF entity 1400 shown in FIG. 14 may convert information about a geographic area that cannot be identified by a network side device into an identifier of a network area that can be identified by the network side device. In this way, assistance may be provided for the network side device in determining a network area in which congestion occurs.

Figure 15:
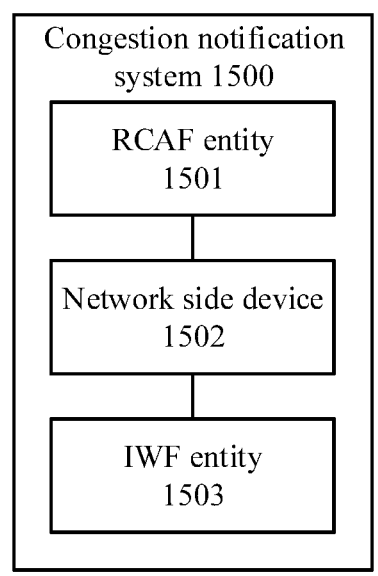
FIG. 15 is a schematic diagram of a congestion notification system according to an embodiment of the present disclosure.

FIG. 15 is a schematic diagram of a congestion notification system according to an embodiment of the present disclosure. As shown in FIG. 15, a congestion notification system 1500 includes an RCAF entity 1501 and a network side device 1502.

The RCAF entity 1501 in the congestion notification system 1500 is the RCAF entity 1300 shown in FIG. 13. The network side device 1502 in the congestion notification system 1500 is the network side device 1100 shown in FIG. 11.

According to the congestion notification system 1500 shown in FIG. 15, when a congestion status of a target network area is acquired, a network side device 1502 may directly send the congestion status to a target application server configured to provide an application service for the target network area. In this way, the target application server may adjust, in time according to the congestion status, a running status of an application corresponding to the target network area. For example, a measure may be applied for, such as improving QoS, reducing transmission bandwidth, or suspending a transmission service. In this way, a waste of a network resource may be reduced or user experience may be improved.

Further, the congestion notification system 1500 shown in FIG. 15 may further include an IWF entity 1503. The IWF entity 1503 in the system 1500 may be the IWF entity 1400 shown in FIG. 14.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A network side device, comprising:

a receiver configured to:

receive a congestion status of a target network area from a radio access network (RAN) congestion awareness function (RCAF) entity, the target network area being a network area involved in an application service provided by a target application server; and receive a first congestion query request from the target application server, the first congestion query request comprising information about a target area, and the first congestion query request requesting to acquire a congestion status of the target area;

a transmitter coupled to the receiver and configured to:

send the congestion status of the target network area to the target application server; and send a second congestion query request to the RCAF entity, the second congestion query request comprising an identifier of the target network area, and the second congestion query request requesting to acquire the congestion status of the target network area; and a processor coupled to the receiver and the transmitter and configured to:

determine, according to the information about the target area, the identifier of the target network area related to the target area; and determine, according to a mapping relationship between the information about a target geographic area and the identifier of the target network area, the identifier of the target network area corresponding to the information about the target geographic area.

2. The network side device of claim 1, wherein the information about the target geographic area comprises information about an area not divided by an operator and that cannot be identified by the network side device.

3. The network side device of claim 1, wherein the network side device is a service capability exposure function (SCEF) entity.

4. An application server, comprising:

a transmitter configured to send a congestion query request to a network side device, the congestion query request comprising information about a target area, the congestion query request requesting to acquire a congestion status of the target area, the information about the target area comprising either an identifier of a target network area or information about a target geographic area, and the information about the target geographic area comprising information about an area not divided by an operator and that cannot be identified by the network side device;

a receiver coupled to the transmitter and configured to receive a congestion status of the target network area related to the target area from the network side device; and a processor coupled to the transmitter and the receiver and configured to adjust a running status of an application according to the congestion status of the target network area.

5. The application server of claim 4, wherein the congestion query request further comprises service content description information of a target application, the receiver being further configured to receive a congestion status of an application in the target network area that matches the target application, and the congestion status being from the network side device.

6. A method implemented by an application server, the method comprising:

sending, by a transmitter of the application server, a congestion query request to a network side device, the congestion query request comprising information about a target area, the congestion query request requesting to acquire a congestion status of the target area, the information about the target area comprising either an identifier of a target network area or information about a target geographic area, and the information about the target geographic area comprising information about an area not divided by an operator and that cannot be identified by the network side device;

receiving, by a receiver of the application server, a congestion status of the target network area related to the target area from the network side device; and adjusting, by a processor of the application server, a running status of an application according to the congestion status of the target network area.

7. The method of claim 6, wherein the congestion query request further comprises service content description information of a target application, and the method further comprises receiving, by the receiver of the application server, a congestion status of an application in the target network area that matches the target application, the congestion status being from the network side device.

* * * * *